Patented Sept. 2, 1930

1,774,992

UNITED STATES PATENT OFFICE

JOSEPH D. McNUTT, OF NEW HAVEN, CONNECTICUT, ASSIGNOR, BY MESNE ASSIGNMENTS, TO WINCHESTER REPEATING ARMS COMPANY, OF NEW HAVEN, CONNECTICUT, A CORPORATION OF DELAWARE

PRIMING MIXTURE

No Drawing.  Application filed November 21, 1927. Serial No. 234,910.

This invention relates to priming mixtures.

An object of the invention is to produce a priming mixture of such character that it will leave no corrosive residuum, thus eliminating corrosion of the gun barrel, which frequently results from the use of cartridges employing some of the priming mixtures now in use.

In a copending application, Serial No. 224,281, filed October 5th, 1927, I have disclosed and claimed a priming mixture characterized by the employment, as an oxygen supplying element, a metallic chromate, either alone or in admixture with another oxidizing substance, preferably a metallic peroxid; as a fuel element, a nitrated organic compound; as a detonating element, a metallic fulminate. The nitrated organic compound specifically disclosed and claimed in my prior application is tetranitroanilin. I have found that tetranitromethylanilin may be substituted for the tetranitroanilin of my prior mixture and that it possesses certain advantages over tetranitroanilin.

In the present invention I accordingly use in a priming mixture a metallic peroxid and a metallic chromate as the chief oxygen supplying elements, a metallic fulminate as the detonating element and tetranitromethylanilin as the principal fuel element.

In carrying out my invention, I preferably employ, dependent upon the commercial strength of the ingredients, substantially 25–40% mercury fulminate (dry weight), 20–40% lead peroxid, 5–10% barium chromate, 3–15% tetranitromethylanilin, 15–25% ground glass, though these proportions may be varied as may be necessary to meet the requirements of various uses of the ultimate mixture.

In proceeding to make my improved priming mixture, the peroxid, chromate, tetranitromethylanilin and ground glass are weighed out, sifted and mixed dry. A small portion of a solution of gum is now added and mixed in. The fulminate in a dampened state is then weighed out and added to the above mixture, and the whole, after being thoroughly mixed, is then used in the ordinary manner of such priming mixtures.

I also find that I may use other heavy metal oxide or nitrates such as barium dioxid or nitrate in place of the lead peroxid and I may substitute the chromate of lead or of mercury for that of barium. Also I may substitute trinitroresorcinol or other suitable nitrated organic substance in whole or in part for the tetranitromethylanilin. Such substitutions, in whole or in part, fall within the scope of my invention.

I claim:

1. A priming mixture, comprising as its principal active constituents, lead peroxid, barium chromate, mercury fulminate, and tetranitromethylanilin.

2. A priming mixture, comprising 20% to 40% of lead peroxid, 5% to 10% barium chromate, 25% to 40% of mercury fulminate, and 3% to 15% tetranitromethylanilin.

3. A priming mixture, comprising 20% to 40% of lead peroxid, 5% to 10% barium chromate, 25% to 40% of mercury fulminate, 3% to 15% tetranitromethylanilin, and 15% to 25% ground glass.

In testimony whereof I affix my signature.

JOSEPH D. McNUTT.